(No Model.)
J. P. ROYALL.
GLOBE FOR SHOWING THE DIRECTIONS OF THE WINDS.
No. 333,971. Patented Jan. 5, 1886.
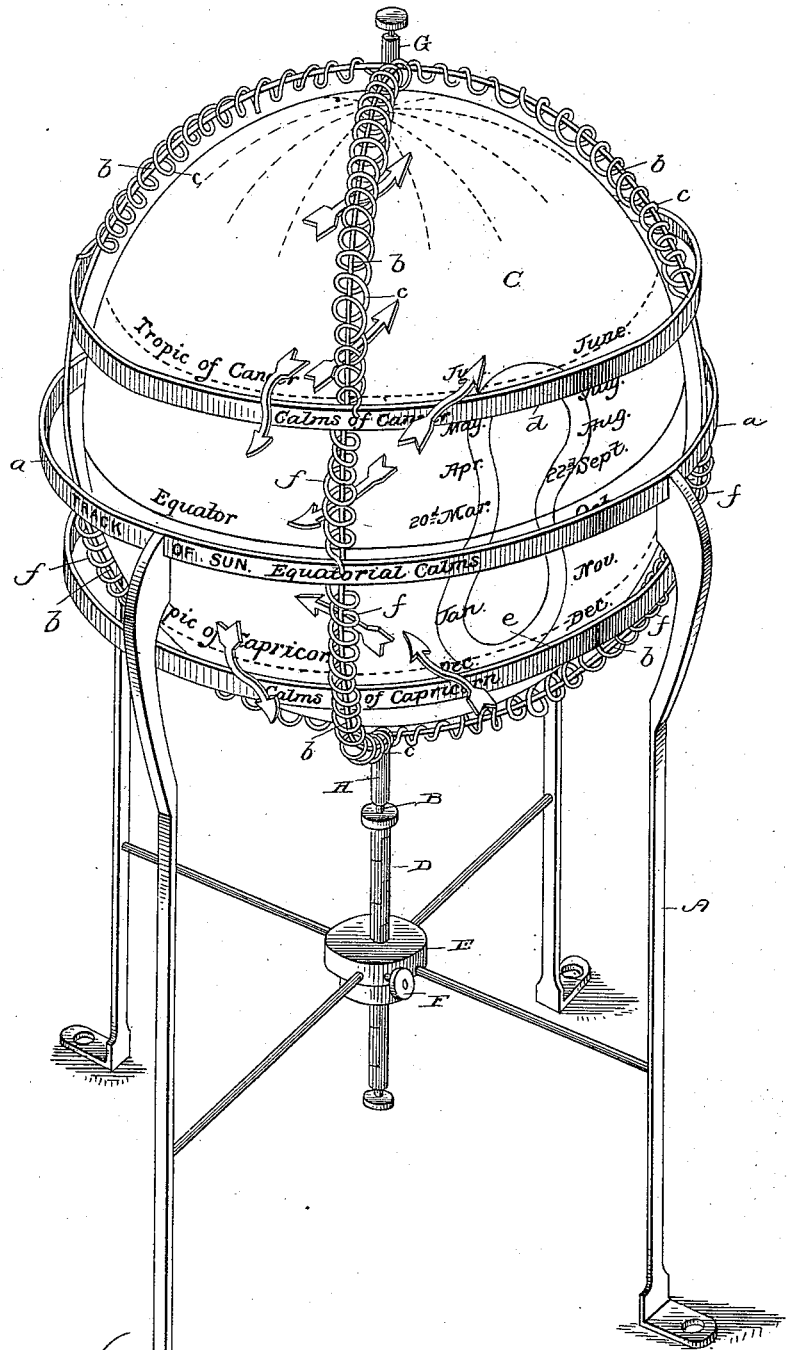
WITNESSES
INVENTOR
J. P. Royall
By his Attorneys

UNITED STATES PATENT OFFICE.

JOHN P. ROYALL, OF COLUMBIA, MISSOURI.

GLOBE FOR SHOWING THE DIRECTIONS OF THE WINDS.

SPECIFICATION forming part of Letters Patent No. 333,971, dated January 5, 1886.

Application filed September 25, 1885. Serial No. 178,174. (No model.)

*To all whom it may concern:*

Be it known that I, JOHN P. ROYALL, a citizen of the United States, residing at Columbia, in the county of Boone and State of Missouri, have invented a new and useful Improvement in Apparatus for Indicating the Prevailing Directions of the Winds at the Various Seasons of the Year, of which the following is a specification, reference being had to the accompanying drawing.

My invention relates to an improvement in apparatus for indicating the prevailing directions of the winds at the various seasons of the year; and it consists in the peculiar construction and combination of devices, that will be more fully set forth hereinafter, and particularly pointed out in the claims.

The object of my invention is to provide an instrument that will indicate the prevailing directions of the winds on the surface of the earth at the various seasons of the year, especially in oceanic climates, and to illustrate, incidentally, the climates of oceanic countries, and, consequently, their vegetable productions.

The accompanying drawing is a perspective view of an apparatus embodying my invention.

A represents a pedestal or frame having a vertical rod, B, which serves as the axis of a globe, C. The lower end of this rod B passes through a tube or sleeve, D, which is supported in a block, E, and clamped thereto at any desired point by a set-screw, F, which passes through one side of the block and bears against the tube. A sleeve, G, is on the rod B at the point corresponding to the north pole of the globe, and a similar sleeve, H, is on the rod at the point corresponding to the south pole of the globe. To the upper end of the pedestal is secured a band or ring, a, indicating the track of the sun and the region of equatorial calms; and b represents wire rings that are secured at their intersecting points at the poles to the sleeves G and H. Springs c are coiled round the wire rings b and are attached to the sleeves G and H, and at their opposite ends are attached to a band or ring, d, which indicates the calms of Cancer, and to a band, e, which indicates the calms of Capricorn. Similar springs, f, connect the bands or rings a, d, and e. By this construction it will be readily understood that the globe is sustained by the springs, and that by moving the rod B and the sleeve D up or down the bands or rings indicating the equatorial and tropical calms may be shifted vertically with relation to the globe. The springs f are not so numerous, or, if so, they are not so strong, as the springs c, and hence it follows that when the bands or rings are shifted the band indicating the equatorial calms will move much farther than those indicating the tropical calms.

Arrows pointing in suitable directions are secured to the tropical bands or rings and to the springs, as shown; and on the analemma of the globe, between the tropic of Cancer and the tropic of Capricorn, is a scale inscribed with the months of the year.

The theory upon which this invention is based is as follows: It is known that the air surrounding the earth is heated by the passage of the rays of the sun through it and by the radiation of the heat of the sun from the earth's surface, and becomes expanded and light, and therefore rises from the surface of the earth at the place where the sun's rays are vertical, and that the colder air from toward the poles rushes toward the track of the sun to take the place of the lighter air which has risen, thus creating in the tropical region two currents of air—one from the north and the other from the south—which meet at the sun's track and produce the equatorial calms. The earth in the torrid region moving at the rate of about a thousand miles an hour eastwardly causes the air to move westerly, and the trade-winds are the result, blowing south of the sun's track in a northwesterly direction, and north of the sun's track in a southwesterly direction. After the air has risen over the sun's track to a considerable height, it is condensed, and becomes heavier than that which is either north or south of it, and flows both north and south to take the place of the winds which flow from the polar regions of the earth toward the sun's track. When this air, which has risen from the sun's track, flowing toward the poles, reaches the earth's surface near the tropics of Cancer and Capricorn meets the currents flowing toward the sun's track, the calms of Cancer and of Capricorn are caused. This air from the equatorial region by some means continues its course in a northerly direction in the north temperate zone, and in a southerly direction in the south temperate zone, and, having acquired a motion swifter than that of the earth, when it reaches the earth's surface, flows in an easterly direction and causes the return trade-winds, which in the northern hemisphere blow in a northeasterly direction, and in the southern hemisphere blow in a southeasterly direction.

If the track of the sun remained over the equator, that would continually be the hottest part of the earth, and the calms of the equator would remain at the same place; but as the sun moves north and south, owing to the inclination of the earth's axis, the hottest part of the earth is shifted in the same direction, and is between the point at which the sun's rays are vertical and the Equator, and where the earth is hottest occur the equatorial calms. When the sun reaches the tropic of Cancer, (for instance,) the calms of the equator are in about twenty-three and a half degrees north latitude, and the calms of Cancer and of Capricorn are also moved in a northerly direction, but not so far as the calms of the equator.

The operation of my invention is as follows: In order to learn the approximate directions of the winds at any time of the year—say, for instance, in December—the set-screw F is loosened and the globe moved until the band or ring a, indicating the track of the sun and the region of equatorial calms, registers with the word "December" on the analemma of the globe. This movement of the band a, owing to the springs c and f, also moves the bands or rings indicating the tropical calms, but not so far as the band a, as before described, and the arrows on the bands and springs indicate the directions, approximately, of the winds, as will be readily understood.

I do not desire to limit myself to the precise construction and arrangement of devices hereinbefore described, as it is evident that many modifications may be made therein without departing from the spirit of my invention. For instance, the globe may be made stationary and the band a attached to and adapted to slide on a rod or support parallel with the axis of the globe, and the extremities of the springs secured at fixed points on said rod or support, the bands indicating the tropical calms being secured to the springs, as in the previous instance.

Having thus described my invention, I claim—

1. The combination, with a globe and a scale indicating the months or seasons of the year, of springs or elastics secured at their extremities at relatively fixed points with regard to the globe, the bands or indicators representing the equatorial and tropical calms secured to the springs or elastics, and arrows or pointers secured to said bands or indicators and to the springs or elastics to indicate the directions of the winds, substantially as described.

2. The combination, with the pedestal having the band a, indicating the track of the sun and the equatorial calms, of the rod or axis B, movable in the pedestal, a set-screw for clamping said rod, the globe, and the sleeves G H on the rod, the rings b, encircling the globe and secured to the said sleeves, the coiled springs on said rings, the bands indicating the tropical calms secured to the springs, the arrows or pointers secured to said bands and springs, and a scale indicating the months or seasons of the year, for the purpose set forth, substantially as described.

3. The combination, with a globe, of springs or elastics secured at their ends to relatively fixed points, and bands or indicators representing the equatorial and tropical calms secured to the springs, as set forth.

In testimony that I claim the foregoing as my own I have hereto affixed my signature in presence of two witnesses.

JOHN P. ROYALL.

Witnesses:
SIMON H. LEVY,
WILLIAM R. SPENCE.